Dec. 30, 1930.                A. O. AUSTIN                1,786,730
                            FITTING FOR INSULATORS
                              Filed June 1, 1926

INVENTOR.
Arthur O. Austin
BY
Nissen & Crane
ATTORNEYS

Patented Dec. 30, 1930

1,786,730

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF OHIO

FITTING FOR INSULATORS

Application filed June 1, 1926. Serial No. 112,745.

This invention relates to fittings for attaching insulators to supporting members or to parts to be supported and for connecting up insulators in series. The object of the invention is to provide a strong and cheap fitting or attachment for coupling up insulators which will have a high degree of mechanical reliability, which will readily permit coupling up or detaching and which cannot become readily disassembled before or during installation.

The invention is exemplified in the combination and arrangement of parts shown in the accompanying drawing and described in the following specification and it is more particularly pointed out in the appended claims.

In the drawing—

In connecting up insulators, particularly those having interlinked fittings, it has heretofore been difficult to provide an inexpensive and effective mechanical device. The fittings or attachments which form the basis of this invention provide an improved means of accomplishing the desired result.

Figure 1:
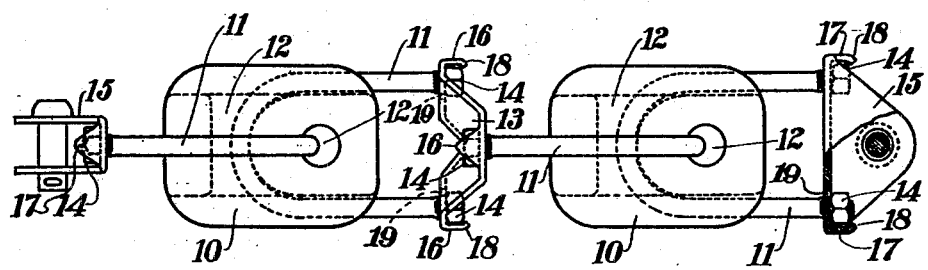
Fig. 1 is an elevation of a pair of insulators in series having fittings embodying one form of the present invention.

In the form of the invention shown in Fig. 1 the members 10 have interlinked U-shaped links or bolts 11 which pass through openings 12 in the insulator. The bolts used for connecting the insulators in series are passed through a warped plate 13 after which nuts 14 are screwed on. The U-shaped links 11 terminating at the ends of the insulator are passed through holes 19 in the end fittings 15 after which the nuts 14 are screwed on. The U-shaped links are usually only partially bent to shape before assembly so that they may be readily inserted in the insulator. After the bolts are inserted in an insulator the two ends are sprung together so that they may be projected through the holes in the plate 13 and in the end fittings 15. The U-shaped bolts 11 project a sufficient distance beyond the end of the insulator so that the nuts may be readily screwed on the ends of the bolts without coming into contact with the warped plates 13 or the sides of the fittings 15. The sides of the end fittings 15 and the walls of the plate 13 will prevent the unscrewing of the nuts when tension is applied. In fact, the friction will prevent the nuts loosening without special locking means. In order to permit greater tolerance between the nuts and bolts and to prevent loosening of the nuts before a load is applied, projecting portions 16 are provided on the warped plate used between adjacent insulator sections and a similar member 17 on the end fittings. This projection is readily formed by bending up material which was originally left in the flat plate before bending. These locking lugs 16 and 17 are located adjacent the flat faces of the nuts so that they will prevent turning of the nuts so long as the nuts are in registration with the lugs, but will not prevent turning of the nuts if the bolts are thrust through the openings in the holding plates sufficiently to bring the nuts beyond the extremities of the lugs. In order to reduce the possibility of accidental release of the nuts, the projecting lugs 16 and 17 are given an inward bend at the points 18. This bend may be given to the lug after the links and nuts are in final position and will prevent the bolt from moving out or, if desired, this lug may be formed originally. In this case, however, it is necessary that the holes 19 in the warped plate 13 and in the end fitting 15 allow clearance in a radial direction so that the bolt can spring in and the flat side of the nut pass the projecting lock 18. After the nut passes the projecting lock 18, the spring in the bolt will hold the nut in an outward position and keep the whole combination locked until installed. The warped plate permits the use of shorter bolts and develops a very high strength for a small amount of material. The special locking features avoid the danger of the parts becoming loosened before installation and permits a very simple type of fitting to be used. The locking lugs 16 and 17 strengthen the combination as well as prevent the nuts from coming off.

Figure 2:
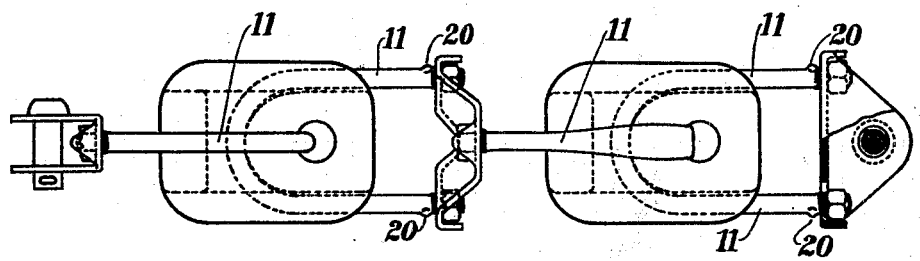
Fig. 2 is a view similar to Fig. 1 showing a modified form of the invention.

Fig. 2 shows another method of locking the bolts so that the nuts cannot become loosened before tension is applied or in operation when one nut may be improperly tightened up tending to loosen the other or due to a faulty bend in the bolt. The construction in Fig. 2 is similar to that in Fig. 1 with the exception that the U-bolts 11 have projecting lugs 20. These projecting lugs are such that the outward spring in the U-bolt tends to prevent them from passing through the end fittings 15 or the warped plate 13. The holes in the plate 15 and in the warped plate 13 are, however, of such shape or size that the U-bolts 11 with the projections 20 will pass through when the bolts are sprung inwardly. This permits the bolts 11 to project sufficiently far through the end plates 15 and the warped plate 13 that the nuts 14 can be screwed onto the bolts. After the nuts are screwed into proper position the bolts are drawn back so that the faces of the nuts are in contact with the bearing surfaces of the plate 13 and end fitting 15. The outward spring in the bolts 11 causes the lugs 20 to engage the rear faces of the end fittings 15 and the plate 13 so that the bolts cannot slide through their openings except when considerable force is used or the bolts are sprung inwardly. As the projecting lugs 17 are so placed that they prevent the nuts from turning, it is seen that the fittings are locked so that they will not become disengaged. This arrangement makes it possible to make fittings which may be readily installed and which at the same time are detachable for making repairs or for making up different insulator combinations. This is highly desirable in practice as different numbers of insulators may be used in series to take care of requirements imposed by different voltages and in some cases it is desirable to change the end fitting or to use only one end fitting, threading the conductor through the opening in the insulator. In some cases only the intermediate fittings are used, the conductors or guys being threaded through the holes in the insulators and forming attachments at the end.

It is evident that riveting the end of the bolt will prevent the nuts coming off. This, however, tends to break the galvanizing and may shorten the life of the fitting or make it difficult to remove same to replace a damaged insulator or to make up a different combination at a later time. In the large sized fittings the U-bolts are usually flattened where they go through the holes in the insulator in order that they may be sprung into position and to provide greater bearing area.

Figure 3:
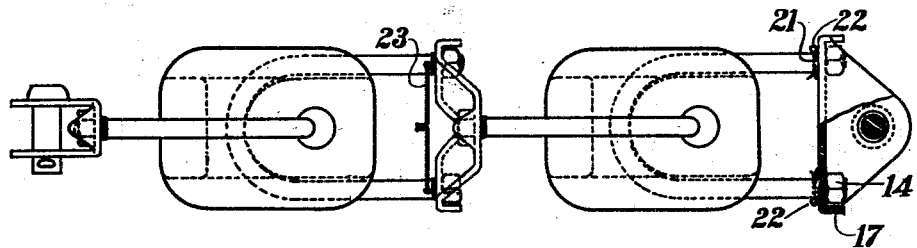
Fig. 3 is a view similar to Fig. 1 showing a different modification.

Another means of insuring locking is shown in Fig. 3. In this case the bolts are provided with holes 21. The cotters 22 or a wire 23 is inserted in the holes after the nuts have been screwed onto the bolts and the bolts have been drawn back so that the locking lugs 17 engage the nuts. This arrangement permits of a minimum size of hole in the warped plate 13 and end fittings 15. If the location of the hole is properly placed and the nut in proper position, the cotters 22 or wire 23 will prevent the bolt sliding through and the nut 14 and the locking lug 17 will engage at all times.

It will be noted from the drawing that the faces of the nuts 14 which engage the yoke 13 and the end member 15 are rounded so that in case of displacement of the axes of the bolts relative to the planes of the holding members the nuts will act in a manner of a ball and socket joint to prevent distortion of the holding members or bending of the ends of the bolts.

I claim—

1. An insulator fitting comprising a holding member having an opening therethru, a bolt projecting through said opening, a nut threaded on the projecting end of said bolt, a lug on said holding member adjacent said opening and in position to engage a lateral face of said nut to hold said nut against rotation relative to said member, said bolt being movable through said opening to clear said nut from said lug and means for holding said bolt against longitudinal movement through said opening to retain said nut in co-operative relation with said lug.

2. An insulator fitting comprising a U-bolt arranged to engage an insulator, a yoke having spaced openings therethru receiving the ends of said U-bolt, nuts threaded on the projecting ends of said U-bolt and locking means fixed to said yoke for preventing rotation of said nuts when said nuts are in engagement with said yoke, said bolt being movable longitudinally through the openings in said yoke to free said nuts from said locking means while said locking means remains stationary relative to said yoke.

3. An insulator fitting comprising a U-bolt, a yoke having spaced openings therethru receiving the ends of said U-bolt, nuts threaded on the projecting ends of said bolt, locking lugs on said yoke and holding said nuts against rotation when in engagement with said yoke the ends of said bolt being movable through said openings to clear said nuts from said lugs, and locking means for holding said bolt against longitudinal movement relative to said yoke to prevent disengagement of said nuts and lugs.

4. An insulator fitting comprising a resilient U-bolt arranged to engage an insulator, a yoke having spaced openings therethru receiving the ends of said U-bolt, lugs on said yoke adjacent said openings, nuts threaded on the projecting ends of said bolts and disposed in holding relation with said lugs when said bolts are retracted through said openings to bring said nuts into engagement with said yoke and locking means held in co-operative relation with said yoke by the resiliency of said U-bolt for retaining said yoke against longitudinal movement on said U-bolt.

5. An insulator fitting comprising a resilient U-bolt, a yoke having perforations therethru for receiving the ends of said U-bolt, nuts threaded on the projecting ends of said U-bolt, holding means on said yoke for engaging said nuts, said nuts being held in engagement with said holding means by the resiliency of said U-bolt, locking means preventing longitudinal displacement of said bolts relative to said yoke, and held in co-operative relation with said yoke by the resiliency of said U-bolt but permitting movement of said nuts away from said holding means when said U-bolt is sprung.

6. An insulator fitting comprising a U-bolt having resiliency therein tending to spread the legs of said bolt, a yoke having spaced openings through which the ends of said bolt project, said openings being larger in diameter than said bolt to permit limited inward movement of said ends, nuts threaded on the projecting ends of said bolt, lugs on said yoke for engaging said nuts, said nuts being held against said lugs by the resiliency of said bolt, locking means for preventing longitudinal movement of said bolts in a direction to move said nuts away from said yoke, said locking means being held in operative position by the resiliency of said bolt and being released when the ends of said bolt are sprung inwardly.

7. An insulator fitting comprising a threaded member and a nut thereon, a member cooperating with said threaded member and having a lug engaging said nut to prevent rotation of said nut relative to the second named member, said lug having means thereon for retaining said members against relative displacement in one direction longitudinally of said threaded member and for holding said lug and nut in cooperative relation.

In testimony whereof I have signed my name to this specification on this 27th day of May, A. D. 1926.

ARTHUR O. AUSTIN.